(12) United States Patent
Zercher

(10) Patent No.: US 6,357,664 B1
(45) Date of Patent: Mar. 19, 2002

(54) IDENTIFICATION CARD UTILIZING AN INTEGRATED CIRCUIT

(75) Inventor: John Michael Zercher, Columbia, PA (US)

(73) Assignee: Identicard Systems Incorporated, Lancaster, PA (US)

( * ) Notice: Subject to any disclaimer, the term of this patent is extended or adjusted under 35 U.S.C. 154(b) by 0 days.

(21) Appl. No.: 09/864,699

(22) Filed: May 24, 2001

(51) Int. Cl.[7] ............................................... F06V 19/02
(52) U.S. Cl. ...................... 235/488; 235/487; 235/492
(58) Field of Search ................... 235/488, 487, 235/492

(56) References Cited

U.S. PATENT DOCUMENTS

| | | |
|---|---|---|
| 4,855,583 A | 8/1989 | Fraser et al. |
| 4,861,644 A | 8/1989 | Young et al. |
| 5,793,882 A | 8/1998 | Piatek et al. |
| 5,822,190 A | * 10/1998 | Iwasaki ........................ 235/788 |
| 5,879,502 A | 3/1999 | Gustafson |
| 5,893,960 A | 4/1999 | Holt |
| 6,024,285 A | 2/2000 | Mish |
| 6,027,027 A | 2/2000 | Smithgall |
| 6,036,099 A | 5/2000 | Leighton |
| 6,086,707 A | 7/2000 | Waller |
| 6,107,010 A | 8/2000 | Corniglion et al. |

FOREIGN PATENT DOCUMENTS

JP          61-141584       *  8/1986

* cited by examiner

*Primary Examiner*—Harold I. Pitts
(74) *Attorney, Agent, or Firm*—Barley, Snyder, Senft & Cohen, LLC

(57) ABSTRACT

The present invention provides an improved identification card having an integrated circuit. The identification card has a first outer layer having printed material on an outer surface and a second outer layer positioned between a laminated sleeve. The second outer layer has an integrated circuit and an antenna on an inner surface and printed material on an outer surface. The first outer layer may be optionally printed at a customer location and inserted into a subassembly having the second outer layer and an inner blocking layer positioned in the sleeve prior to final lamination.

12 Claims, 4 Drawing Sheets

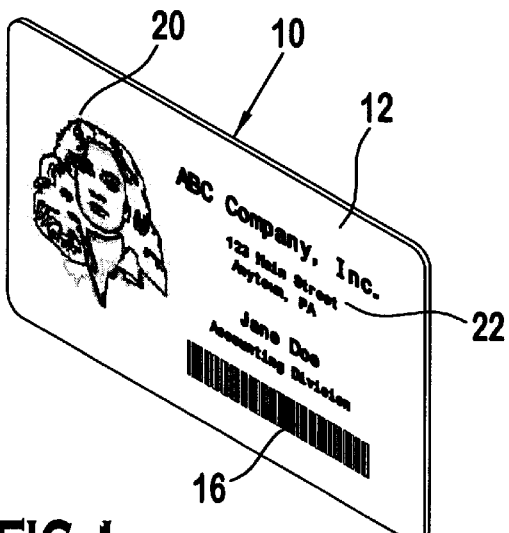
FIG. 1
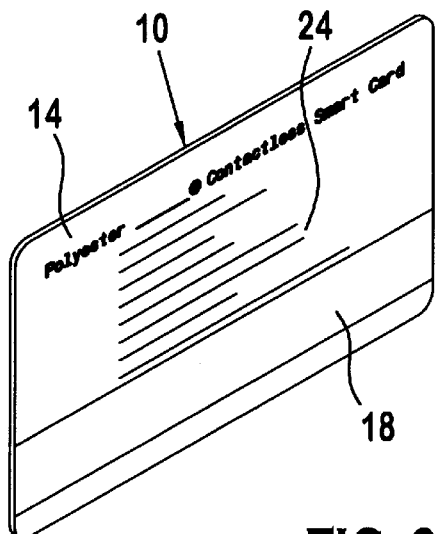
FIG. 2
FIG. 3
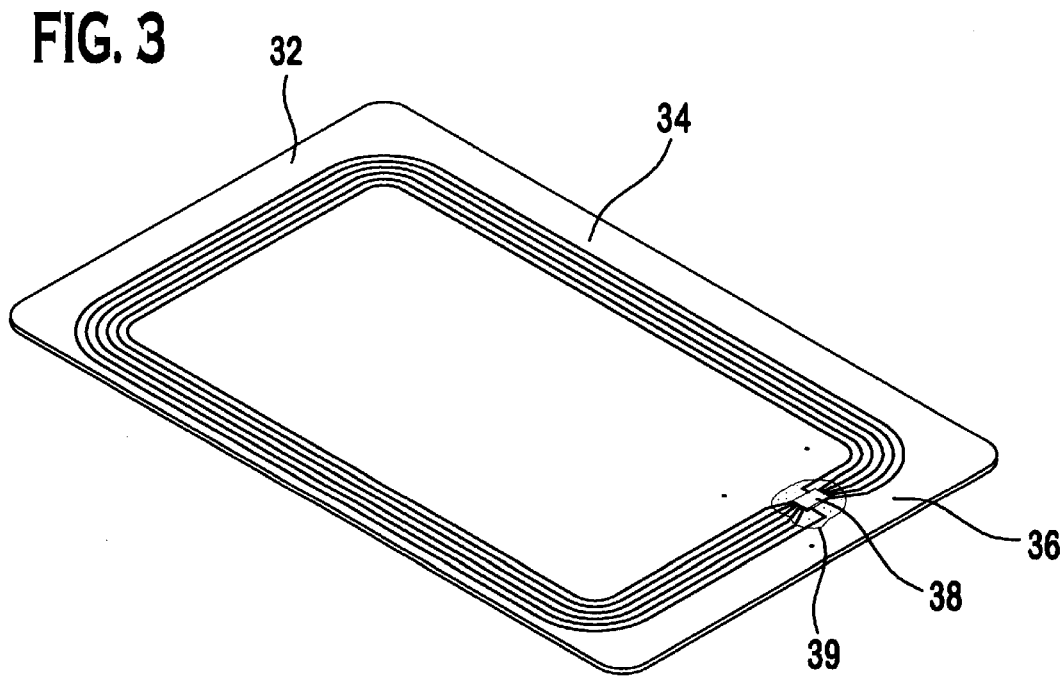

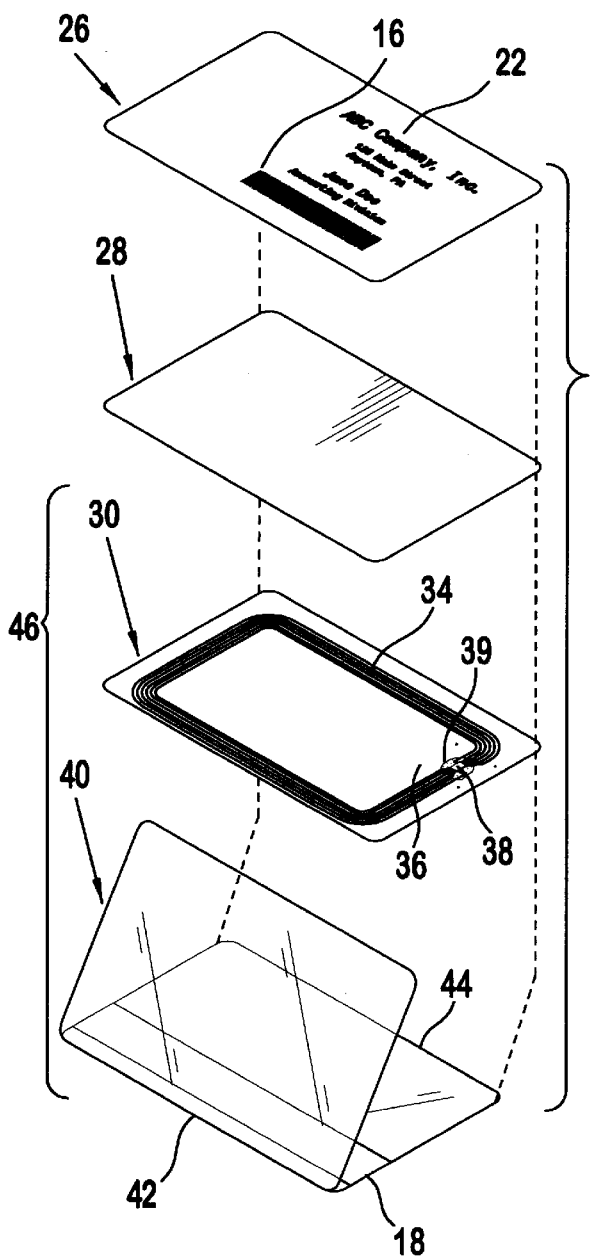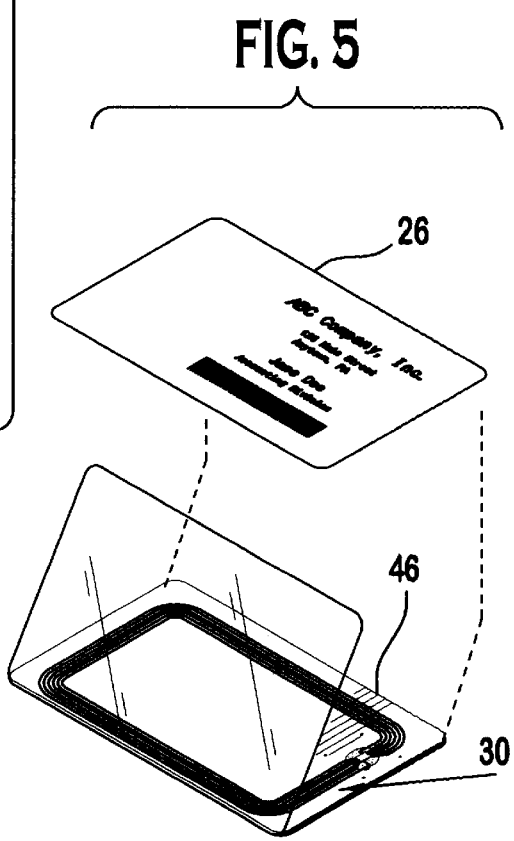

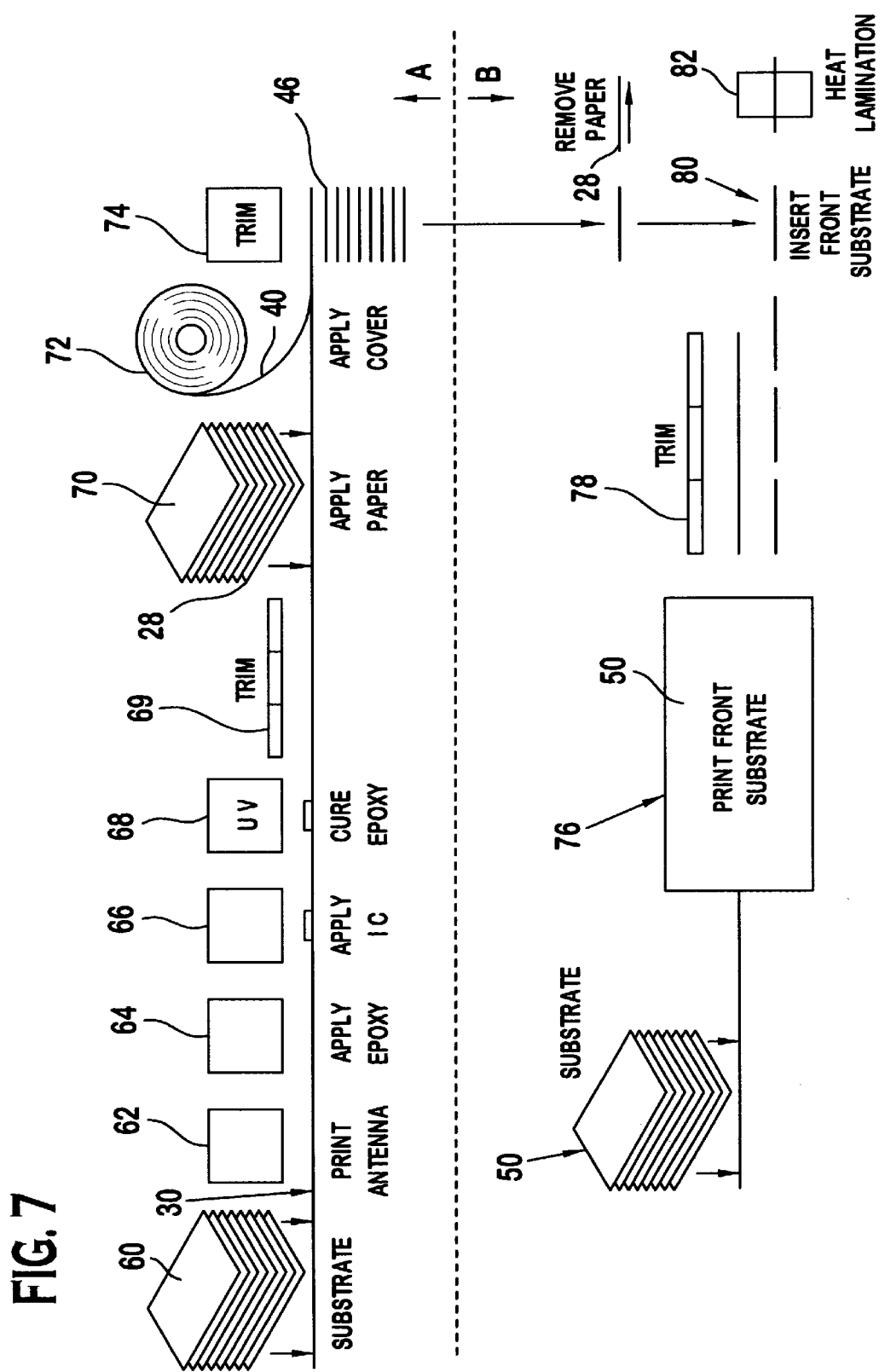

IDENTIFICATION CARD UTILIZING AN INTEGRATED CIRCUIT

FIELD OF THE INVENTION

The present invention relates generally to cards containing information about a user and more specifically to an identification card utilizing an integrated circuit.

BACKGROUND OF THE INVENTION

Identification cards are being utilized in greater numbers for access control systems, tracking of personal data, at points of sale, and in many other applications. The identification cards typically contain information about a user or an object to which they are attached. For example, in access control systems an identification card may contain a user's name, employee number, and other employee specific information to allow the employee access to various locations within an employer's facilities. Within hospitals, such identification cards may contain patient specific data such as age, medical condition, allergies to medication, and other data utilized in treating and billing patients. These identification cards typically consist of a multi-layer structure having one or more plastic layers surrounding integrated circuits which store the data. Data is transferred to and from the cards either through electrical contacts or radio frequency (RF) transmission. For RF transmission, contactless versions of these identification cards include an antenna for transmitting data to and from the integrated circuits.

One example of such an identification card is disclosed in U.S. Pat. No. 4,855,583. This patent teaches an identification card and method of making a multi-layer structure which has an outer layer of PVC material printed with information and/or a company logo. Another PVC layer having a window sized to receive a proximity electronic data storage device surrounds the storage device which contains an integrated circuit and the antenna. Another PVC layer may be provided with a window for containing a magnetic material which also has user specific data coded thereon. The various PVC layers and outer transparent films are secured to each other by the use of double sided contact adhesive materials dispersed between the layers. The cards may be fabricated in sheets containing a matrix of cards which is then cut into individual cards at the end of the process.

Several problems exist with such arrangements in that PVC is utilized for its rigidity in order to protect the antenna and integrated circuit from breaking upon flexure. Each layer of PVC must be of a prescribed thickness to surround and protect the components. In order to maintain the rigidity required and house the components necessary, these PVC cards tend to be relatively thick as compared to other types of cards such as a credit card. The resulting multi-layer structure is approximately 0.060 inches thick. Additionally, PVC tends to become brittle with age and exposure to ultraviolet rays. This contributes to card failure in time. Additionally, specialized printing equipment is required to print information on the outer surfaces of the PVC material.

Another example of a simplified card is shown in U.S. Pat. No. 6,027,027. This patent discloses a luggage tag assembly which is formed by printing an antenna onto a substrate utilizing conductive ink. An integrated circuit chip is then applied to the antenna utilizing a curable epoxy. A top cover having printed information is adhesively applied either at the point of manufacture or at the point of service (POS) such as a luggage checkin counter. Although this design is thinner and more flexible than that of the '583 patent, it is not designed for long life. That is, it is designed to contain information for a luggage itinerary typically completed within one or two days. The assembly is not sealed from moisture or damage due to impact and repeated use. Antennas are typically formed of a thin metallic material which is susceptible to damage is flexed.

What is needed is an improved identification card having storage capability, being thin and flexible, and being constructable by inexpensive printing equipment.

SUMMARY OF THE INVENTION

It is therefore an object of this invention to provide an improved Identification Card having reduced thickness, and versatility to allow assembly either at a manufacturing site or a point of service location.

This and other objects are achieved by providing a multi-layer identification card structure having an outer laminate sleeve surrounding a substrate having an antenna printed thereon, and an integrated circuit applied on the substrate in contact with the antenna.

BRIEF DESCRIPTION OF THE DRAWINGS

The invention will now be described by way of example with reference to the accompanying figures of which:

FIG. 1 shows a perspective front view of the identification card according to the present invention.

FIG. 2 shows a rear perspective view of the identification card of FIG. 1.

FIG. 3 shows a perspective view of an inner surface of one of the layers inside the identification card of FIG. 1.

FIG. 4 is an exploded perspective view showing the layers of the identification card of FIG. 1.

FIG. 5 is an exploded perspective view showing two layers of FIG. 5 in a subassembly and a third layer exploded out of the subassembly.

FIG. 7 is a diagramatic view of the assembly process for the identification card.

DETAILED DESCRIPTION OF THE PREFERRED EMBODIMENTS

Figure 6:
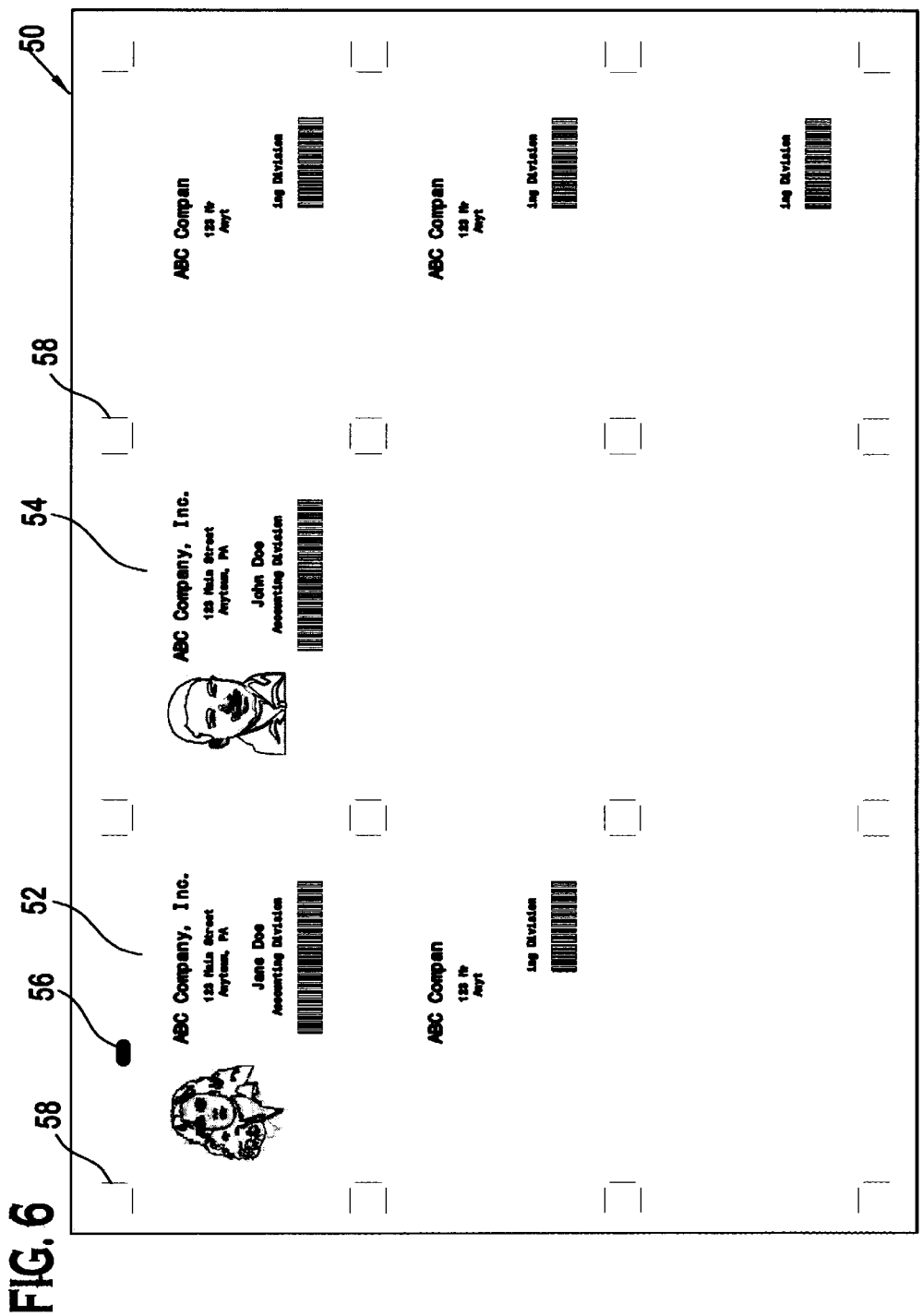
FIG. 6 shows a matrix sheet of one of the layers of FIG. 4.

The invention will first be described generally with reference to FIGS. 1 and 2. The identification card 10 is a thin card having a front side 12 and a back side 14. The front side 12 may optionally have printed information 22 along with diagramatic or photographic information 20. An optional bar code 16 may also be provided on the front side 12. Similarly, the back side 14 contains printed information 24 and a magnetic strip 18. It should be understood that while the bar code 16, graphic information 20 and printed information 22 are shown on the front side 12, this information may optionally be placed on the back side 14 or eliminated. Similarly, the elements of the back side 14 may be placed on the front side 12. Inside the identification card 10 are a plurality of layers which may contain an integrated circuit for storing additional user specific information, an antenna for transmitting data between the integrated circuit and another device, or contacts for transmitting data between the identification card 10 and another device.

Each of the major components of the identification card 10 will now be described in greater detail with reference to FIGS. 3–5. Referring first to FIG. 4, the identification card 10 is constructed from a plurality of layers 26, 28, 30 and an outer sleeve 40. A first outer layer 26 is a substrate formed of a plastic material preferably TESLIN which is manufactured by PPG Industries of Pittsburgh, PA. It should be understood, however, that other suitable materials which are capable of receiving printed material may be utilized. The outer surface of the first outer layer 26 has optional printed information 22 and an optional bar code 16. These are applied utilizing a standard ink jet or other printer. An inner layer 28 serves as a temporary, removable blocking layer and may consist of any thin blocking material such as paper or another substrate. Paper is the preferred material for the inner layer 28.

The second outer layer 30 is formed of a substrate preferably TESLIN. Once again, it should be understood that any suitable thin material capable of receiving a printed antenna may be utilized for the substrate. Printed on an inner surface of the second outer layer 30 is an antenna 34 and a plurality of positioning marks 36. This inner surface is best shown in FIG. 3. The antenna 34 consists of a plurality of loops extending from an area near the positioning marks 36. An integrated circuit 38 is preferably fixed to the inner surface utilizing a curable epoxy as is well known in Flip Chip technology. The integrated circuit 38 is positioned to contact opposite ends of the antenna loops. The outer surface of this second outer layer 30 may optionally have printed information 24 which forms the back side 14 of the identification card 10.

A sleeve 40 is formed of a clear laminate material and surrounds the outer layers 26, 30. The sleeve 40 has a hinged end 42 and an open end 44. The outer layers 26, 30, and inner layer 28 fit into the hinged end 42. An optional magnetic strip 18 is provided along a surface of the sleeve 40.

A method of making the identification card 10 will now be described in greater detail with reference to FIGS. 4–7. Referring first FIG. 6, a matrix 50 formed on a substrate which eventually forms the first outer layer 26 of each card 10 is shown. The matrix 50 has printed text on one surface. The printed text is grouped in individual card sections 52, 54. Also included are, positioning marks 56 which can be detected later in the process for positioning the matrix 50 within other printing or cutting equipment. Border marks 58 are provided surrounding each individual card section 52, 54. Included in the text information in each individual card section 52, 54 are a photograph, text material, and a bar code. It should be understood by those reasonably skilled in the art however, that any printed information may be placed on this side of the matrix 50. That information may or may not include, the photo, the text, or the bar code and also may include other information such as, numerical codes, or magnetic printed information which is specific to a user or an object.

The first outer layer 26 is manufactured by printing information as described above onto the matrix 50 at a printing station 76 as shown in FIG. 7 in the second portion labeled "B". It should be understood that the preferred material, TESLIN, will receive this printing utilizing standard printer equipment such as an ink jet or laser jet printer. The matrix is then rimmed at a trimming station 78 in a two step process. First, the matrix is trimmed into strips and then the strips are cut into individual first layers 26 for assembly into the identification card 10 as will be described below.

Referring again to FIG. 7, assembly of the second outer layer 30 will now be described in greater detail. In the first portion "A" of the process, a substrate is supplied in sheets 60 which are fed first through an antenna print station 62 where the antenna 34 is applied utilizing standard printing equipment equipped with conductive ink. The conductive ink is then cured through a heating process. Each substrate is then fed to an epoxy application station 64 where epoxy 39 is applied in the area which will receive the integrated circuit chip 38. Next, the substrate is fed through an integrated circuit application station 66 where the IC chip 38 is applied over the epoxy and is positioned to be in contact with the antenna 34. The substrate continues along to an epoxy curing station 68 where the previously applied epoxy is cured to secure the IC chip 38 in place. Next, the substrate passes a trim station 69 wherein the matrix is cut into one dimensional arrays of strips. For example, a three by three matrix having antennas 34 printed thereon may be cut into three separate one by three arrays of strips wherein each strip contains three antennas 34 arranged in a single row.

Next, the inner layer 28 is applied at a paper application station 70. The substrate then passes a cover application station 72 where the sleeve 40 is applied over the second and third layers 28, 30 such that they are maintained in the hinge end 42 of the sleeve 40. Once the sleeve 40 is applied to the strip, it passes through a second trim station 74 where the strip is cut into individual subassemblies 46. Each individual subassembly 46 at this stage contains a sleeve 40 surrounding the second and third layers 28, 30 as shown in FIG. 4.

To complete the final assembly, the inner 28 layer is then removed, the trimmed first layers 26 from the second portion "B" of the process as described above are individually inserted into the subassemblies 46 at insertion step 80. The subassembly 46 having the first layer 26 inserted is then laminated at the lamination step 82 utilizing standard lamination equipment. It should be understood by those reasonably skilled in the art that the first portion "A" of the assembly process in FIG. 7 can be completed at a card manufacturer's location while the second portion "B" of the assembly process may be completed at a point of service or a customer location where identification cards are used as shown in FIG. 5. Since the second portion "B" of the process only requires standard printing equipment, substrate material maybe supplied to the customer and the customer may then print, insert and laminate the first layer 26 to the subassembly 46. The inner layer 28 serves to block the antenna 34 from bleeding on to the leeve 40 during shipping. Optionally, the entire process including both portions "A" and "B", ay be completed at card manufacturer's location according to customer specifications. In this case the inner layer 26 may be eliminated from the process since there is no risk of the antenna bleeding because the second outer layer 26 will be applied before the sleeve 40. Where the second portion of the process "B" is conducted at the point of service or customer location, the customer has ultimate flexibility in selecting what material is printed on the substrate 50. Additionally, no specialized equipment is required to conduct the printing and trimming operations at the point of service.

What is claimed is:

1. An identification card comprising:
   a first outer layer being formed of a substrate having printed material on an outer surface;
   a second outer layer being formed of a substrate having an antenna printed on an inner surface utilizing conductive ink, and an integrated circuit being electrically connected to the antenna also on the inner surface; and
   an outer sleeve surrounding the outer layers and secured thereon by a lamination process.

2. The identification card of claim 1 further comprising an inner blocking layer positioned between the first and second outer layers.

3. The identification card of claim 2 wherein the first outer layer and the inner layer are positioned into the outer sleeve to form a subassembly prior to the lamination process.

4. The identification card of claim 3 wherein the inner layer is removed and replaced by the second outer layer prior to the lamination process.

5. The identification card of claim 1 wherein the first outer layer substrate is formed from TESLIN.

6. The identification card of claim 1 wherein the second outer layer substrate is formed from TESLIN.

7. An identification card subassembly comprising: an inner layer formed of TESLIN material having an antenna printed on an inner surface utilizing conductive ink and an integrated circuit chip also on the inner surface in electrical communication with the antenna;

an inner blocking layer positioned over the inner surface of the first layer; and an outer sleeve having a hinged end for receiving the layers and for securing them temporarily during shipment.

8. A method of making an identification card subassembly comprising the steps of:

supplying a substrate to an antenna print station;

printing an antenna on an inner surface of the substrate;

applying an integrated circuit chip to the inner surface, the integrated circuit chip being in electrical contact with the antenna;

applying an inner blocking layer over the inner surface of the substrate; and inserting the substrate and inner blocking layer into a lamination sleeve.

9. The method of claim 8 wherein the substrate is supplied to the antenna print station in a sheet.

10. The method of claim 9 wherein the substrate sheets are trimmed after application of the integrated circuit chip to the antennas.

11. The method of claim 8 further comprising the steps of removing the inner blocking layer and replacing the inner blocking layer with a second outer layer.

12. The method of claim 11 wherein the subassembly is laminated.

* * * * *

UNITED STATES PATENT AND TRADEMARK OFFICE
CERTIFICATE OF CORRECTION

PATENT NO. : 6,357,664 B1
DATED : March 19, 2002
INVENTOR(S) : John Michael Zercher It is certified that error appears in the above-identified patent and that said Letters Patent is hereby corrected as shown below:

Column 2,
Line 5, change "is" to -- if --;

Column 3,
Line 60, change "rimmed" to -- trimmed --;

Column 4,
Line 44, change "ay" to -- may --.

Signed and Sealed this

Twenty-eighth Day of May, 2002

*Attest:*

*Attesting Officer*

JAMES E. ROGAN
*Director of the United States Patent and Trademark Office*